US010355966B2

(12) United States Patent
Wasmundt et al.

(10) Patent No.: US 10,355,966 B2
(45) Date of Patent: Jul. 16, 2019

(54) MANAGING VARIATIONS AMONG NODES IN PARALLEL SYSTEM FRAMEWORKS

(71) Applicant: Advanced Micro Devices, Inc., Sunnyvale, CA (US)

(72) Inventors: Samuel Lawrence Wasmundt, San Diego, CA (US); Leonardo Piga, Austin, TX (US); Indrani Paul, Round Rock, TX (US); Wei Huang, Austin, TX (US); Manish Arora, Dublin, CA (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 227 days.

(21) Appl. No.: 15/081,558

(22) Filed: Mar. 25, 2016

(65) Prior Publication Data

US 2017/0279703 A1    Sep. 28, 2017

(51) Int. Cl.
*H04L 12/26* (2006.01)
*H04L 29/08* (2006.01)

(52) U.S. Cl.
CPC .............. *H04L 43/16* (2013.01); *H04L 43/08* (2013.01); *H04L 67/10* (2013.01)

(58) Field of Classification Search
CPC .......... H04L 43/16; H04L 43/08; H04L 67/10
See application file for complete search history.

(56) References Cited

U.S. PATENT DOCUMENTS

| 2014/0006534 A1* | 1/2014 | Jain ................. G06F 9/5094 709/208 |
| 2014/0245298 A1* | 8/2014 | Zhou ................ G06F 9/455 718/1 |
| 2015/0236971 A1* | 8/2015 | Sesha ............... H04L 47/70 709/226 |
| 2016/0187944 A1* | 6/2016 | Eastep .............. G06F 1/324 713/300 |
| 2017/0034016 A1* | 2/2017 | Carroll ............. H04L 41/0813 |
| 2017/0063654 A1* | 3/2017 | Acuna ............... H04L 43/08 |

(Continued)

OTHER PUBLICATIONS

Piga et al., U.S. Appl. No. 14/959,669, entitled "Balancing Computation and Communication Power in Power Constrained Clusters", filed Dec. 4, 2015, 41 pages.

(Continued)

*Primary Examiner* — Brian Whipple
*Assistant Examiner* — James Ross Hollister
(74) *Attorney, Agent, or Firm* — Meyertons Hood Kivlin Kowert and Goetzel PC; Rory D. Rankin

(57) ABSTRACT

Systems, apparatuses, and methods for managing variations among nodes in parallel system frameworks. Sensor and performance data associated with the nodes of a multi-node cluster may be monitored to detect variations among the nodes. A variability metric may be calculated for each node of the cluster based on the sensor and performance data associated with the node. The variability metrics may then be used by a mapper to efficiently map tasks of a parallel application to the nodes of the cluster. In one embodiment, the mapper may assign the critical tasks of the parallel application to the nodes with the lowest variability metrics. In another embodiment, the hardware of the nodes may be reconfigured so as to reduce the node-to-node variability.

20 Claims, 9 Drawing Sheets

(56) References Cited

U.S. PATENT DOCUMENTS

2017/0109205 A1* 4/2017 Ahuja ................ G06F 9/505

OTHER PUBLICATIONS

Piga, Leonardo, U.S. Appl. No. 15/183,625, entitled "Managing Cluster-Level Performance Variability Without a Centralized Controller", filed Jun. 15, 2016, 41 pages.
Kegel, Andrew G., U.S. Appl. No. 15/298,049, entitled "Systems and Methods for Trusted Cluster Attestation", filed Oct. 19, 2016, 28 pages.
Bauer, Mike, "New Mapping Interface", Dec. 7, 2015, pp. 1-23, http://legion.stanford.edu/pdfs/bootcamp2015/04_mapping.pdf. [Retrieved Oct. 15, 2018].

* cited by examiner

| Node ID | Die Temperature | Case Temperature | Ambient Temperature | Age | Performance | ... | Current Variability Metric | Estimated Future Variability Metric |
|---|---|---|---|---|---|---|---|---|
| 115A | 39° C | 51° C | 21° C | 13 months | 80% | ... | 1.8 | 1.9 |
| 115B | 34° C | 44° C | 18° C | 22 months | 65% | | 2.7 | 3.2 |
| 115C | 42° C | 56° C | 19° C | 5 months | 95% | | 0.9 | 1.0 |
| ... | | | | | ... | | ... | ... |

Variability Metric Table 500

MANAGING VARIATIONS AMONG NODES IN PARALLEL SYSTEM FRAMEWORKS

The invention described herein was made with government support under contract number DE-AC52-07NA27344 awarded by the United States Department of Energy. The United States Government has certain rights in the invention.

BACKGROUND

Technical Field

Embodiments described herein relate to processing devices and more particularly, to managing variations among nodes in parallel system frameworks.

Description of the Related Art

Parallel computing is the simultaneous execution of the same application or workload using multiple processing elements (e.g., nodes in a multi-node cluster) in order to obtain results faster. A parallel workload can be split up to be executed a piece at a time on many different nodes, and then put back together again at the end to get a data processing result.

Executing multi-node applications can lead itself to node variability even with its relative homogeneity. A task-based programming model aims to map tasks to different nodes, and many modern programming frameworks (e.g., Legion, HADOOP®) utilize the concept of a mapper to help load balance the system. These frameworks are based on the single program multiple data (SPMD) paradigm where one single program (i.e., task) runs in multiple nodes operating on different data. Existing job schedulers and task mappers that map or schedule tasks onto nodes do not take into account variations among the nodes. The existing job schedulers and task mappers assume nodes are homogeneous for the same product (server or processor) during task scheduling, leading to poor choice of nodes and sub-optimal performance and power consumption.

SUMMARY

Systems, apparatuses, and methods for managing variations among nodes in parallel system frameworks are contemplated.

A multi-node cluster may be configured to perform various types of parallel processing applications where a workload is split up into a plurality of tasks to be performed simultaneously on the plurality of nodes. The cluster may include a cluster agent configured to monitor the nodes of the cluster. The cluster agent may capture various physical and functional sensory data associated with the nodes, and the cluster agent may calculate node-to-node variability as a function of these physical and functional sensory inputs. Additionally, the cluster agent may track the variability of the nodes over time. The cluster agent may use the variability information for task scheduling and mapping of tasks onto nodes. For example, in one embodiment, if a first node is higher performing compared to other nodes, the cluster agent may map critical tasks (i.e., the ones that take more time to execute) to the first node.

In another embodiment, the cluster agent may attempt to reduce the node-to-node variability of the cluster. In this embodiment, the node hardware may be reconfigured (through dynamic voltage and frequency scaling (DVFS) or changing any other parameters such as number of cores, memory bandwidth, cache size, etc.) such that performance and power efficiency are maximized and variability is reduced. Reducing variability may be advantageous for workloads which are partitioned into tasks of equal complexity.

These and other features and advantages will become apparent to those of ordinary skill in the art in view of the following detailed descriptions of the approaches presented herein.

BRIEF DESCRIPTION OF THE DRAWINGS

The above and further advantages of the methods and mechanisms may be better understood by referring to the following description in conjunction with the accompanying drawings, in which:

FIG. 5 illustrates one embodiment of a variability metric table.

DETAILED DESCRIPTION OF EMBODIMENTS

In the following description, numerous specific details are set forth to provide a thorough understanding of the methods and mechanisms presented herein. However, one having ordinary skill in the art should recognize that the various embodiments may be practiced without these specific details. In some instances, well-known structures, components, signals, computer program instructions, and techniques have not been shown in detail to avoid obscuring the approaches described herein. It will be appreciated that for simplicity and clarity of illustration, elements shown in the figures have not necessarily been drawn to scale. For example, the dimensions of some of the elements may be exaggerated relative to other elements.

Figure 1:
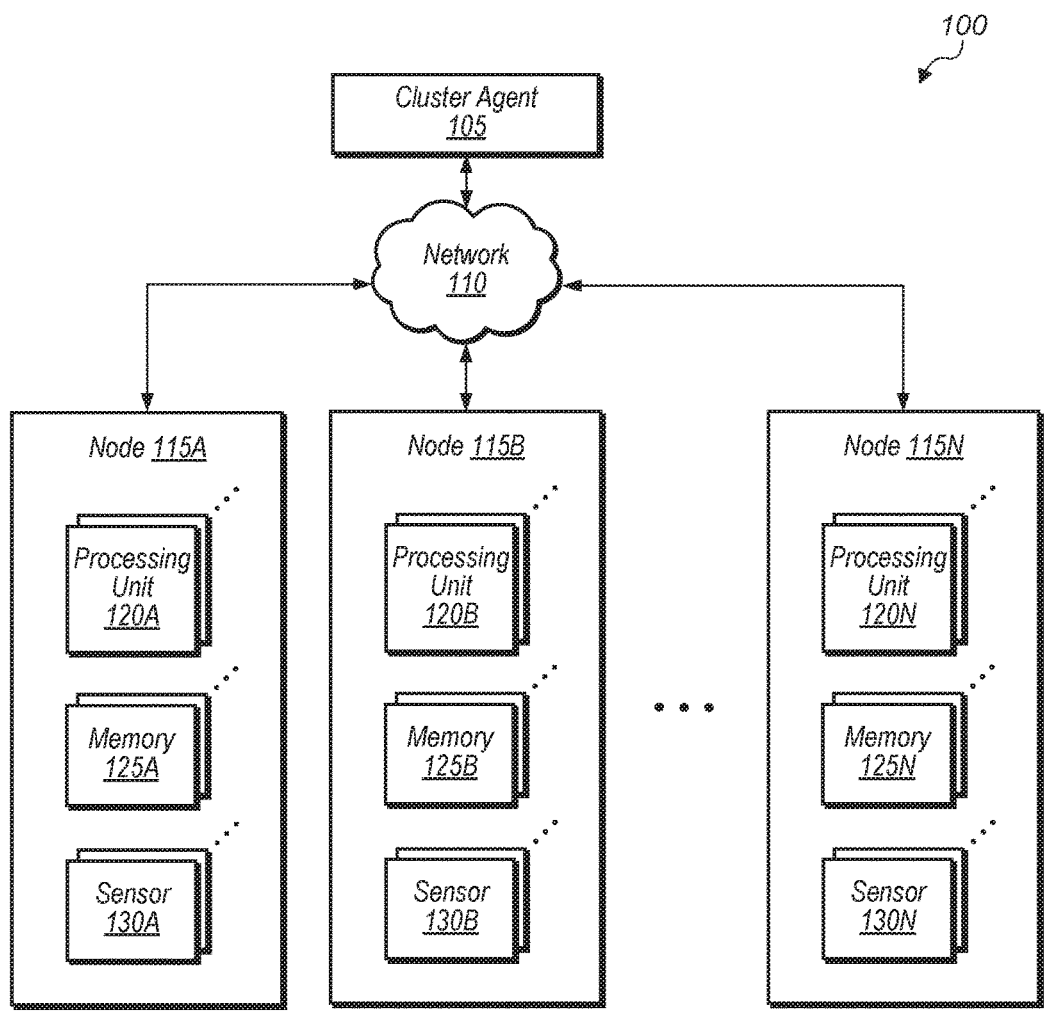
FIG. 1 is a block diagram of one embodiment of a computing system.

Referring now to FIG. 1, a block diagram illustrating one embodiment of a computing system 100 is shown. As shown in FIG. 1, system 100 may include cluster agent 105, network 110, and nodes 115A-N, which are representative of any number and type of compute nodes. In various embodiments, system 100 may be used to process and store data, perform computational tasks, and transmit data to other devices and systems using network 110 or another network. In one embodiment, system 100 may perform data processing on large datasets. For example, system 100 may be configured to execute any of various types of workloads (e.g., parallel processing applications, MapReduce operations, simulations, modeling applications) depending on the embodiment.

Node 115A may include one or more processing units 120A, one or more memories 125A, and one or more sensors 130A. Similarly, nodes 115B and 115N may include one or more processing units 120B and 120N, one or more memories 125B and 125N, and one or more sensors 130B and 130N, respectively. Sensors 130A-N are representative of any number and type (e.g., die temperature, ambient temperature, power consumption) of sensors. For example, for a multi-core processor, there may be a temperature sensor for each core of the processor.

Generally speaking, a node 115A-N may be defined as an apparatus or system with at least one computing/processing element (e.g., processor, processor core, programmable logic device, application specific integrated circuit) and at least one memory device. The at least one computing element of the node may be configured to execute instructions and/or perform one or more types of computations (e.g., floating point, integer, memory, I/O) depending on the embodiment. The components of each node 115A-N may be interconnected by one or more communication buses. Processing units 120A-N are representative of any number and any type of processing element (e.g., CPU, GPU, processor core, accelerated processing unit (APU)). Processing units 120A-N may have any number and type of caches (e.g., L1 cache, L2 cache). Processing units 120A-N may be configured to execute instructions concurrently or in parallel.

Various types of memories 125A-N may be utilized in nodes 115A-N, including random-access memory (RAM), static RAM (SRAM), dynamic RAM (DRAM), high-speed CMOS, high-density DRAM, eDRAM, 3D stacked memory (e.g., stacked DRAM), interposer-based integrated memory, multi-chip modules (MCM), off-chip DRAM on a motherboard, non-volatile RAM (NVRAM), magneto-optical storage medium, read only memory (ROM), synchronous DRAM (SDRAM), double data rate SDRAM (DDR SDRAM), phase-change memory, spin-transfer torque magnetic RAM, memristor, extended data output (EDO) RAM, Rambus RAM, Rambus DRAM, erasable programmable memory (EEPROM), solid-state memory, hard disk drive, optical storage mediums, etc.

In various embodiments, network 110 may include any number and type of networks (e.g., local area network (LAN), wide area network (WAN), wireless networks, an Intranet, the Internet, storage area network (SAN)). Examples of LANs include Ethernet networks, Fiber Distributed Data Interface (FDDI) networks, and token ring networks. Network 110 may also represent any type of wired or wireless connection medium. For example, wired mediums may include Ethernet, fiber channel, etc. Wireless connection mediums may include a wireless connection using a wireless communication protocol such as IEEE 802.11, a modem link through a cellular service, a satellite link, etc.

In one embodiment, cluster agent 105 may utilize a single program multiple data (SPMD) paradigm to map tasks to different nodes 115A-N. While the nodes 115A-N are performing their tasks, cluster agent 105 may be configured to track and manage the variability among the nodes 115A-N by monitoring performance and sensor data from the nodes 115A-N. In various embodiments, cluster agent 105 may be implemented using any suitable combination of hardware and/or software. Cluster agent 105 may collect a variety of data to calculate current variability metrics and to estimate future variability metrics of nodes 115A-N. In one embodiment, cluster agent 105 may be configured to generate variability metrics for each node of nodes 115A-N. Then, cluster agent 105 may utilize the variability metrics in determining how to map tasks of workloads to the nodes 115A-N. Cluster agent 105 may utilize the variability metrics in conjunction with existing mapping heuristics to allow job schedulers and task mappers increased flexibility and control.

In various embodiments, system 100 may experience node variability even with homogeneous nodes 115A-N using the same or equivalent physical hardware components. The variations among nodes can be due to many factors such as aging, temperature, power, performance, hardware, instruction set architectures (ISAs), communication calls, fault rates, process variations, application characteristics, etc. Cluster agent 105 may be configured to manage these heterogeneities to optimize system level performance and power efficiency. Cluster agent 105 may express and manage node to node variability dynamically at run-time while mapping and re-mapping tasks to nodes to optimize system level performance and power efficiency.

Cluster agent 105 may utilize a run-time environment, a scheduler, and a run-time manager to track heterogeneity and manage variability among nodes 115A-N over time. The run-time manager may capture various physical and functional sensory data and estimate variability as a function of these inputs. For example, variability could be measured using processor sensor measurements, workload characteristics, ambient conditions, dynamic voltage and frequency scaling (DVFS) residencies, communication calls, failure rates, etc. The variability metric may be one overall metric capturing any type of node to node variation, or the variability metric may be a class of metrics to capture variability information of each type. Variability may also be expressed in terms of a relative statistical distribution among the nodes 115A-N. Granularity of variability could be node to node or among a set of nodes, racks, or cabinets. Variability information could be calculated periodically at certain intervals or may be user driven.

Once the run-time manager determines variability across all nodes 115A-N, the run-time manager may manage the variability. The run-time manager may utilize the variability information at run-time for task scheduling and mapping of tasks onto nodes 115A-N. For example, if a node is higher performing compared to the other nodes, the task mapper may decide to place critical tasks onto this node. Task mapping of tasks to nodes 115A-N may be static or dynamic, depending on the embodiment. The scheduler can decide the priority of the different factors contributing to variability and map accordingly to optimize for a system level objective. Power management controllers in the nodes 115A-N can use this variability information to reconfigure the hardware (through DVFS or changing any other parameters such as number of cores, memory bandwidth, cache size, etc.) such that performance and power efficiency are maximized, and variability is reduced.

Modern programming frameworks (e.g., Legion, HADOOP) provide an ability to map tasks dynamically on to the right node or server through usage of performance and locality information. Mapping decisions regarding how tasks are assigned to processors and how physical instances of logical regions are assigned to memories are made by mappers. Mappers may be part of application code and implement a mapping interface, and mappers may be queried by the run-time manager whenever any mapping decision needs to be made. The run-time environment may ensure that mapping decisions only impact performance and are orthogonal to correctness.

By extending programming models with node-to-node variability information, system 100 is able to leverage this variability information to create a more efficient yet still performance aware ecosystem. Cluster agent 105 may include a variability manager that feeds variability metric information to the task mapper to generate task scheduling and mapping decisions. The power management controller, user, or the scheduler is then able to use this information to appropriate craft the mapper's dynamic runtime behavior.

These techniques may also be extrapolated to a generic model that uses any mapping method in a SPMD model where node variance is present. These techniques allow the ability to dynamically control heterogeneity in a large scale system to optimize for performance and power efficiency. Additionally, long term increased performance may be achieved as a result of decreased thermals by understanding and accounting for power spikes through power aware scheduling and task stealing enabled by the heuristics described herein.

Figure 2:
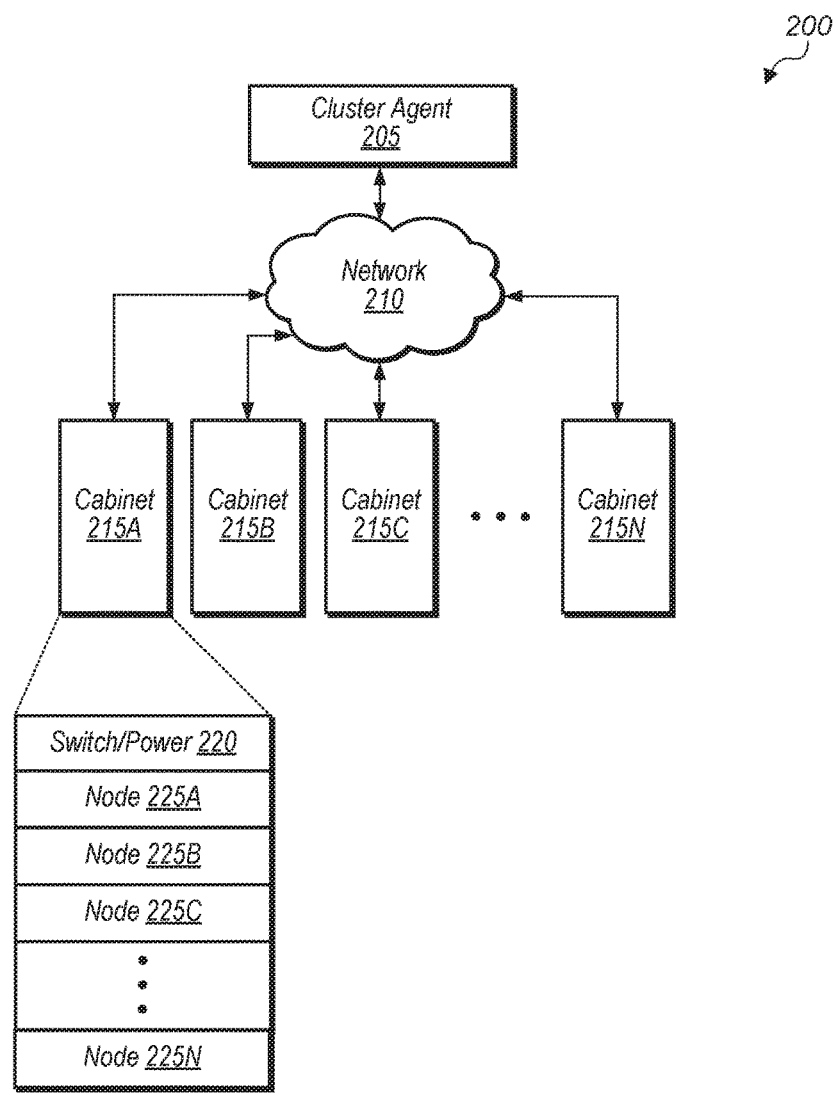
FIG. 2 is a block diagram of another embodiment of a computing system.

Turning now to FIG. 2, a block diagram illustrating another embodiment of a computing system 200 is shown. As shown in FIG. 2, system 200 may include cluster agent 205, network 210, and cabinets 215A-N. Each cabinet of cabinets 215A-N may include a plurality of nodes. In various embodiments, system 200 may be used to process and store data, perform computational tasks, and transmit data to other devices and systems using network 210 or another network. In one embodiment, system 200 may perform data processing on large datasets. For example, system 200 may be configured to execute any of various types of workloads (e.g., parallel processing applications, MapReduce operations, simulations, modeling applications) depending on the embodiment. System 200 may also be configured to work in various types of power constrained environments where the total amount of power allowed to be consumed by system 200 is capped. It is noted that system 200 may also be referred to as a supercomputer, data center, cluster, high performance computing (HPC) cluster, or cloud computing cluster.

As shown in FIG. 2, cabinet 215A includes switch/power unit 220 and nodes 225A-N, which are representative of any number and type of nodes. In one embodiment, cluster agent 205 may be configured to manage the assignment of tasks to nodes, calculate and/or predict the variability metrics of the nodes 225A-N of the cluster, manage the assignment of power caps to each of the nodes, and/or perform other management functions. In one embodiment, cluster agent 205 may be implemented on one or more of the nodes of cabinets 215A-N. In another embodiment, cluster agent 205 may be implemented separately from cabinets 215A-N in system 200. The nodes within each cabinet 215A-N may be interconnected to one another through a switch (e.g., switch/power unit 220) and the cabinets 215A-N within system 200 may also be interconnected through a switch (not shown). The switch/power unit 220 may also be configured to provide power to the nodes of cabinet 215A. Alternatively, in another embodiment, there may be separate switch and power units, with power being provided to nodes 225A-N via a backplane or other mechanism. In some embodiments, there may be multiple switches and/or power units per cabinet.

Figure 3:
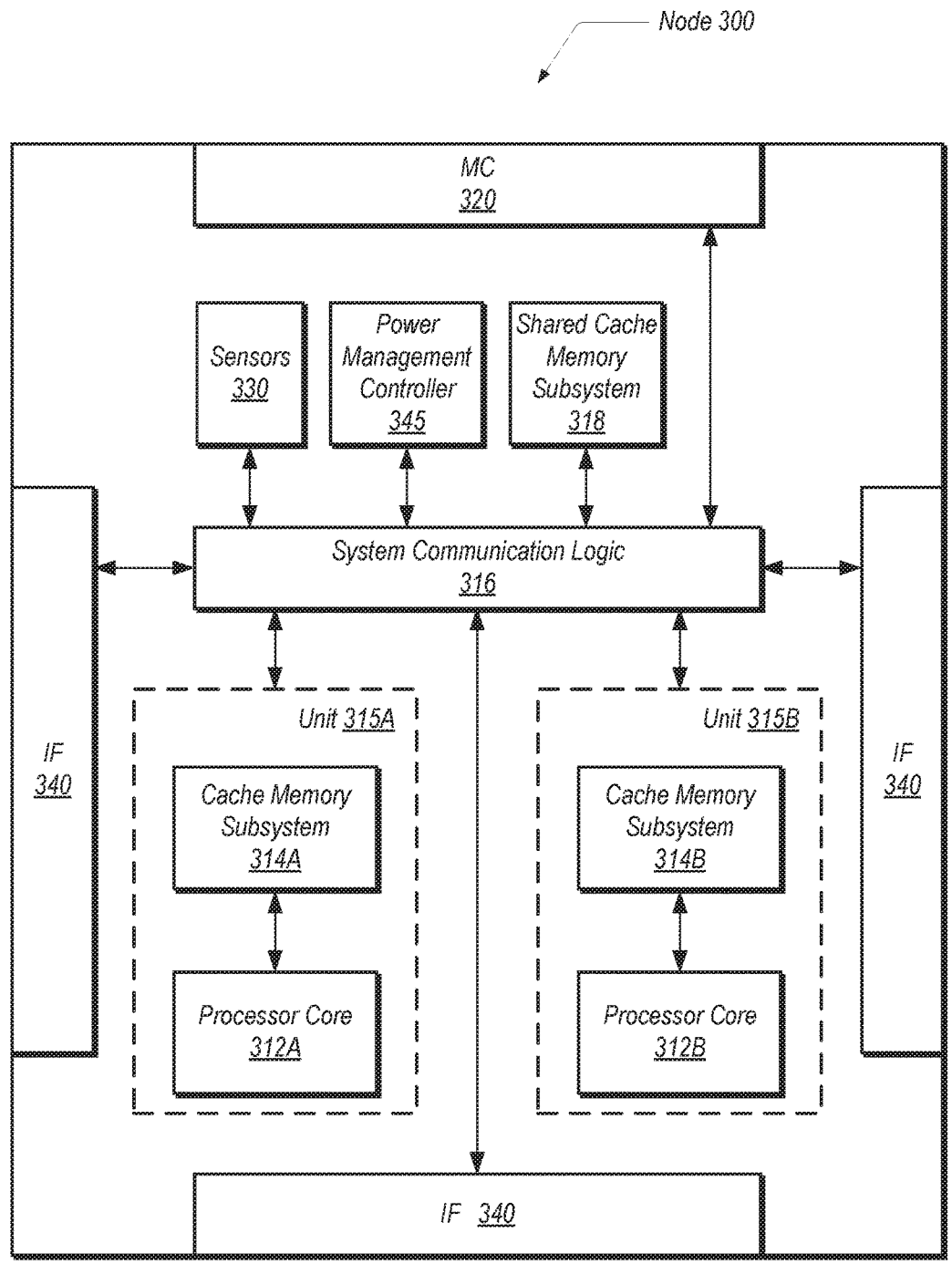
FIG. 3 is a block diagram of one embodiment of a node.

Referring now to FIG. 3, a block diagram of one embodiment of a node 300 is shown. The components of node 300 may be included within each node of nodes 115A-N (of FIG. 1) or nodes 225A-N (of FIG. 2). Node 300 may include memory controller (MC) 320, interface logic 340, one or more processing units 315A-315B, which may include processor cores 312A-312B and corresponding cache memory subsystems 314A-314B, system communication logic 316, sensor(s) 330, power management controller 345, and a shared cache memory subsystem 318. In one embodiment, the illustrated functionality of node 300 may be incorporated into a single integrated circuit. In another embodiment, the illustrated functionality may be incorporated in a chipset on a computer motherboard.

In one embodiment, node 300 may be a stand-alone system within a mobile computer, a desktop, a server, or other device or system. In other embodiments, node 300 may be one node within a socket of a multi-socket system. In some embodiments, the processing units 315A-315B and one or more other sources outside of node 300 may access the shared cache memory subsystem 318. The other sources may include general-purpose processors and graphical processing units (GPU's) on other nodes, input/output (I/O) devices, and so forth. In other embodiments, another level of cache, such as caches 314A-314B, in the cache memory hierarchy may be shared by multiple sources.

Sensor(s) 330 may include any number and type of sensors, depending on the embodiment. For example, in one embodiment, sensor(s) 330 may include a temperature sensor for each core, a package temperature sensor, and/or one or more other sensors. The data captured by sensor(s) 330 may be sent to a cluster agent for tracking and for generating cluster-wide node variability data. The cluster agent may be configured to utilize the node variability data to determine how to distribute tasks to the nodes of the cluster and/or reduce the variability among the nodes of the cluster. Power management controller 345 may be configured to utilize node variability information to reconfigure the hardware of node 300 (through DVFS or changing any other parameters such as number of cores, memory bandwidth, cache size, etc.) such that performance and power efficiency are maximized, and variability is reduced. For example, power management controller 345 may be configured to reduce voltage or frequency supplied to the processors of the node, shutdown one or more cores, shutdown one or more memory banks, and/or shutdown one or more memory controllers to reduce node variability.

Processor cores 312A-312B may include circuitry for executing instructions according to a predefined instruction set. Although two processor cores 312A-312B are shown in FIG. 3, node 300 may include another number of processor cores, such as a single processor core, four processor cores, and so forth. In one embodiment, the x86® instruction set architecture (ISA) may be selected. Alternatively, the x86-64®, Alpha®, PowerPC®, MIPS®, SPARC®, PA-RISC®, or any other instruction set architecture may be selected. Generally, processor cores 312A-312B access the cache memory subsystems 314A-314B, respectively, for data and instructions.

Cache memory subsystems 314A-314B and 318 may comprise high-speed cache memories or arrays configured to store blocks of data. Cache memory subsystems 314A-314B may be implemented as a hierarchy of caches. In one embodiment, cache memory subsystems 314A-314B each represent L2 cache structures, and shared cache memory subsystem 318 represents an L3 cache structure. An L1 cache structure may be integrated within each of the processor cores 312A-312B. Other embodiments are possible and are contemplated.

Memory controller 320 may be used to connect the node 300 to off-die memory. Memory controller 320 may comprise control circuitry for interfacing to memories. Memory controller 320 may follow memory channel protocols for determining values used for information transfer, such as a number of data transfers per clock cycle, signal voltage levels, signal timings, signal and clock phases and clock frequencies. Additionally, memory controller 320 may include request queues for queuing memory requests. The off-die memory may include one of multiple types of dynamic random access memories (DRAMs). The DRAM may be further connected to lower levels of a memory hierarchy, such as a disk memory and offline archive memory.

The interface 340 may include integrated channel circuitry to directly link signals to other processing nodes, which include another processor. The interface 340 may utilize one or more coherence links for inter-node access of processor on-die caches and off-die memory of another processing node. Examples of the technology include HyperTransport and QuickPath. The interface 340 generally provides an interface for input/output (I/O) devices off the node 300 to the shared cache memory subsystem 318 and processing units 315A-315B. I/O devices may include many variations of computer peripheral devices.

In one embodiment, system communication logic 316 may be a system bus. In another embodiment, node 300 may incorporate a Northbridge system bus controller in logic 316 in order to couple processing units 315A-315B to an off-chip memory, I/O devices, other off-chip processors such as a graphics processing unit (GPU), another type of single-instruction-multiple-data (SIMD) core, a digital signal processor (DSP), other general-purpose processors, and so forth. In such an embodiment, system communication logic 316 may replace or incorporate the functionality of memory controller 320 and interface logic 340.

In one embodiment, system communication logic 316 may incorporate both a Northbridge and a Southbridge system bus controller. A Northbridge protocol may be used to couple processing units 315A-315B to off-chip memory and a GPU. A Southbridge protocol may be used to couple processing units 315A-315B to I/O devices, a real time clock, a power management unit, or other components. One example of such an embodiment of logic 316 may include the AMD-762™ Northbridge system controller and the AMD-768™ Southbridge peripheral bus controller.

In yet another embodiment, node 300 may be one socket of a multi-socket system. System communication logic 316 may incorporate packet-processing logic in such an embodiment. Generally speaking, system communication logic 316 may be configured to respond to control packets received on the links to which the node 300 is coupled, to generate control packets in response to processor cores 312A-312B and/or cache memory subsystems 314A-314B, to generate probe commands and response packets in response to transactions selected by the memory controller 320 for service, and to route packets for which node 300 is an intermediate node to other nodes through interface logic 340. Interface logic 340 may include logic to receive packets and synchronize the packets to an internal clock used by packet processing logic within logic 316.

Figure 4:
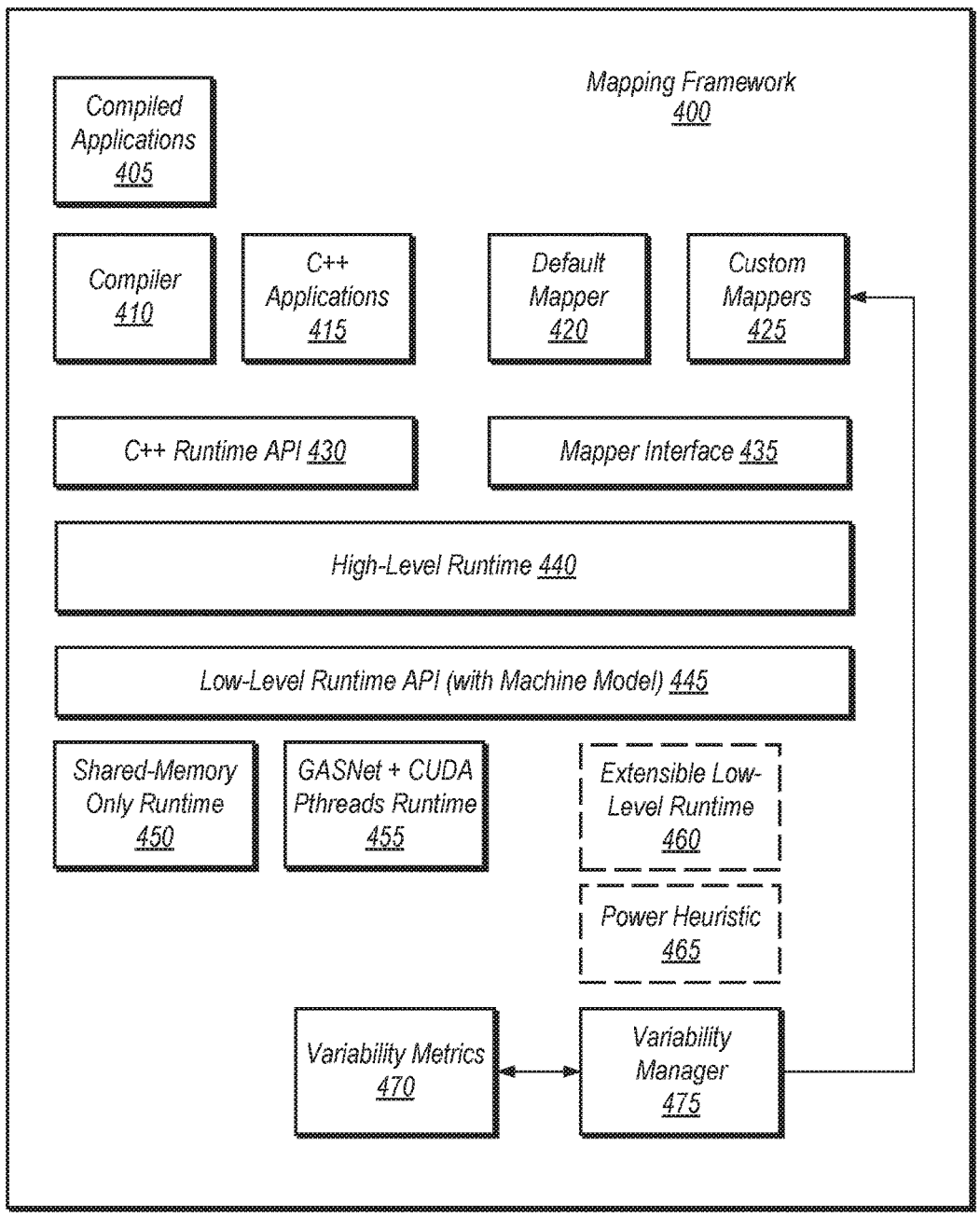
FIG. 4 is a block diagram of one embodiment of a mapping framework.

Turning now to FIG. 4, a block diagram of one embodiment of a mapping framework 400 is shown. In various embodiments, mapping framework 400 may be implemented as part of a cluster agent (e.g., cluster agent 105 (of FIG. 1), cluster agent 205 (of FIG. 2)). In one embodiment, mapping framework 400 may work within the framework of a Legion mapper. In other embodiments, mapping framework 400 may implement a framework based on other types of mappers. As shown in FIG. 4, mapping framework 400 may include compiled applications 405, compiler 410, C++ applications 415, default mapper 420, custom mappers 425, C++ runtime application programming interface (API) 430, mapper interface 435, high-level runtime 440, low-level runtime API (with machine model) 445, shared-memory only runtime 450, Global-address space networking (GAS-Net)+compute unified device architecture (CUDA®) portable Operating System Interface (POSIX) threads (Pthreads) runtime 455, extensible low-level runtime 460, power heuristic 465, variability metrics 470, and variability manager 475. It is noted that the organization of mapping framework 400 is merely one example of a mapping framework which may be utilized with the methods and mechanisms described herein. In other embodiments, other structures of mapping frameworks with other organizations of components may be utilized. It should also be understood that other languages besides C++ may be used in other embodiments.

In one embodiment, variability manager 475 may be configured to generate and utilize variability metrics 470 for coupling to custom mappers 425. The variability metrics 470 may include metrics calculated from the past sensor and performance data and/or estimated variability metrics for future workload processing. Custom mappers 425 may utilize the variability metrics 470 as one of the inputs for determining how to map tasks to the various nodes. For each task of a given workload, custom mappers 425 may be configured to select the node on which to run the task. In one embodiment, custom mappers 425 may be configured to make mapping decisions based on one or more variability metrics 470 which are only available at runtime. The power management controller, user, or the scheduler is then able to use this information to appropriately craft the custom mappers 425 dynamic runtime behavior. In another embodiment, custom mappers 425 may be configured to make mapping decisions statically based on stored values of variability metrics 470.

Referring now to FIG. 5, one embodiment of a variability metric table 500 is shown. In one embodiment, table 500 may be stored as part of variability metrics 470 of FIG. 4. Table 500 may include any number of entries for any number of nodes (e.g., nodes 115A-C (of FIG. 1)) being monitored in the cluster. Each entry may include any number of fields, depending on the embodiment. As shown in FIG. 5, table 500 includes fields for die temperature, case temperature, ambient temperature, age, performance, current variability metric, and estimated future variability metric. In one embodiment, the performance metric for each node may be calculated based on the time (or an average of times) it has taken the node to perform task(s) of previous workloads. The cluster agent (e.g., cluster agent 105) may track how quickly each node completes its assigned task(s), and the cluster agent may use this data to generate a performance metric or score for each node of the cluster. For example, while running an application, if the cluster agent detects that a first node is consistently slower than the other nodes, the cluster agent may mark the first node as a slower node (with a lower performance score).

The variability metric for each entry may be calculated from the metrics stored in the other fields of the entries of table 500. Depending on the embodiment, any of various techniques may be utilized for calculating the variability metric. For example, in one embodiment, the variability metric may be calculated from a formula which adds together each of the values multiplied by a weighting factor. In this embodiment, the variability metric may be equal to the sum of field 1 ($F_1$) of table 500 multiplied by a first weighting factor ($W_1$), field 2 ($F_2$) of table 500 multiplied by a second weighting factor ($W_2$), field 3 ($F_3$) of table 500 multiplied by a third weighting factor ($W_3$), etc. Accordingly, the variability metric may equal $F_1*W_1+F_2*W_2+F_3*W_3+ \ldots F_N*W_N$, where 'N' is the number of fields of table 500. In other embodiments, non-linear relationships (e.g., polynomial, exponential, machine learning) between the variability metric and the fields of table 500 may be utilized.

In another embodiment, table 500 may store entries for other entities besides nodes. For example, table 500 may include an entry for each cabinet of the cluster, with each cabinet including a plurality of nodes. Alternatively, table 500 may include an entry for each processor or processing unit of the cluster. Other embodiments may track the variability metrics for other entities. Additionally, the cluster agent may track one or more values associated with the relative statistical distribution of the variability metrics for the nodes. For example, in one embodiment, the cluster agent may track the variance of the variability distribution of the nodes using the formula shown below:

$$\text{Variance} = \frac{1}{N} \sum_{i=1}^{N} (x_i - \mu)^2$$

where $x_i$ are the variability metrics of the nodes, $\mu$ is the mean of the variability metrics, and N is the number of nodes in the cluster. It should be understood that one or more of the fields shown in the entries of table 500 may be omitted and/or one or more fields not shown may be included in these entries. Additionally, not all of the fields shown in the entries of table 500 may be utilized to generate the variability metrics for the nodes. In some cases, only a subset of the values from these fields may be utilized to generate the variability metrics for the nodes.

In another embodiment, the cluster agent may utilize the sensor and performance data stored in table 500 to reduce the variability among the nodes. The cluster agent may reduce the performance of the highest performing nodes by reducing the voltage and/or frequency to match the performance of the lowest performing nodes. In this embodiment, the cluster may be executing a workload with tasks that are of equal complexity, and the workload may benefit from being executed on a cluster with nodes having little to no variability. In this scenario, the cluster agent may reduce the performance of the highest performing nodes by an amount which is proportional to and calculated based on the corresponding variability metrics. In some cases, the cluster agent may utilize the current variability metric for its calculations, while in other cases, the cluster agent may utilize the estimated future variability metric for its calculations. In further cases, the cluster agent may utilize a combination of the current variability metric and the estimated future variability metric for its calculations.

Figure 6:
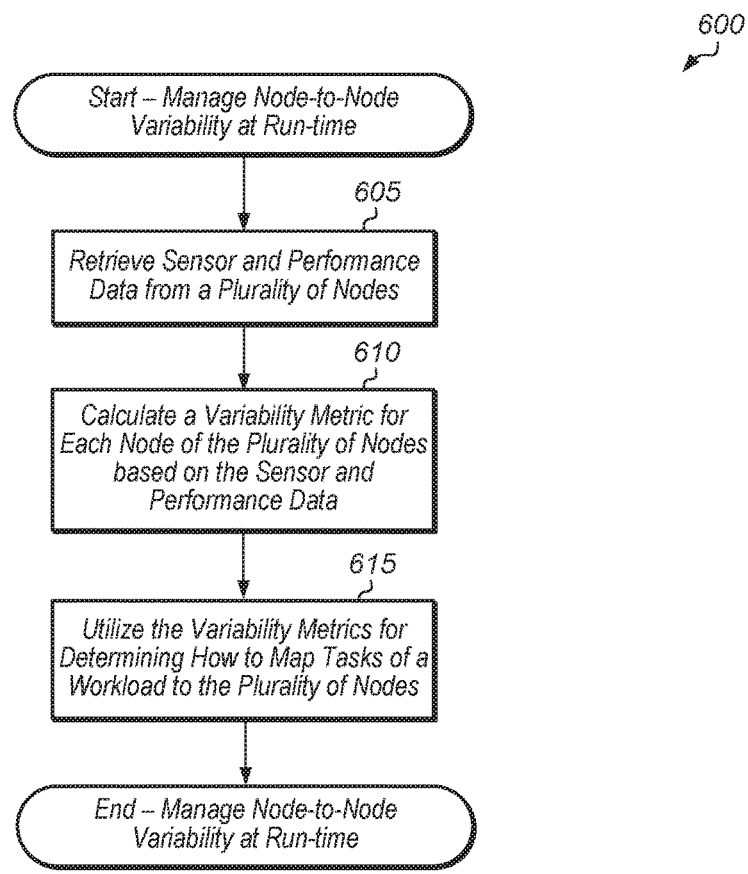
FIG. 6 is a generalized flow diagram illustrating one embodiment of a method for managing node-to-node variability at run-time.

Turning now to FIG. 6, one embodiment of a method 600 for managing node-to-node variability at run-time is shown. For purposes of discussion, the steps in this embodiment are shown in sequential order. It should be noted that in various embodiments of the method described below, one or more of the elements described may be performed concurrently, in a different order than shown, or may be omitted entirely. Other additional elements may also be performed as desired. Any of the various systems or processors described herein may be configured to implement method 600.

A cluster agent may retrieve sensor and performance data associated with a plurality of nodes of a multi-node cluster (block 605). Depending on the embodiment, the sensor and performance data may include one or more of aging, temperature, power, performance, hardware, instruction set architectures (ISAs), communication calls, fault rates, process variations, application characteristics, and other parameters. The cluster agent may calculate a variability metric for each node of the plurality of nodes based on the sensor and performance data (block 610). In some embodiments, the cluster agent may also predict a future variability metric for each node of the plurality of nodes based on the sensor and performance data.

Next, the cluster agent may utilize the variability metrics (at least in part) for determining how to map tasks of a workload to the plurality of nodes (block 615). For example, in one embodiment, the cluster agent may utilize the variability metrics to map more tasks to the higher performance nodes. In another embodiment, the cluster agent may assign the tasks on the critical path to the higher performance nodes. In a further embodiment, the cluster agent may attempt to minimize variability in the nodes by reducing the voltage and/or frequency of the higher performance nodes to bring them down to a similar level with the lower performance nodes. After block 615, method 600 may end.

Figure 7:
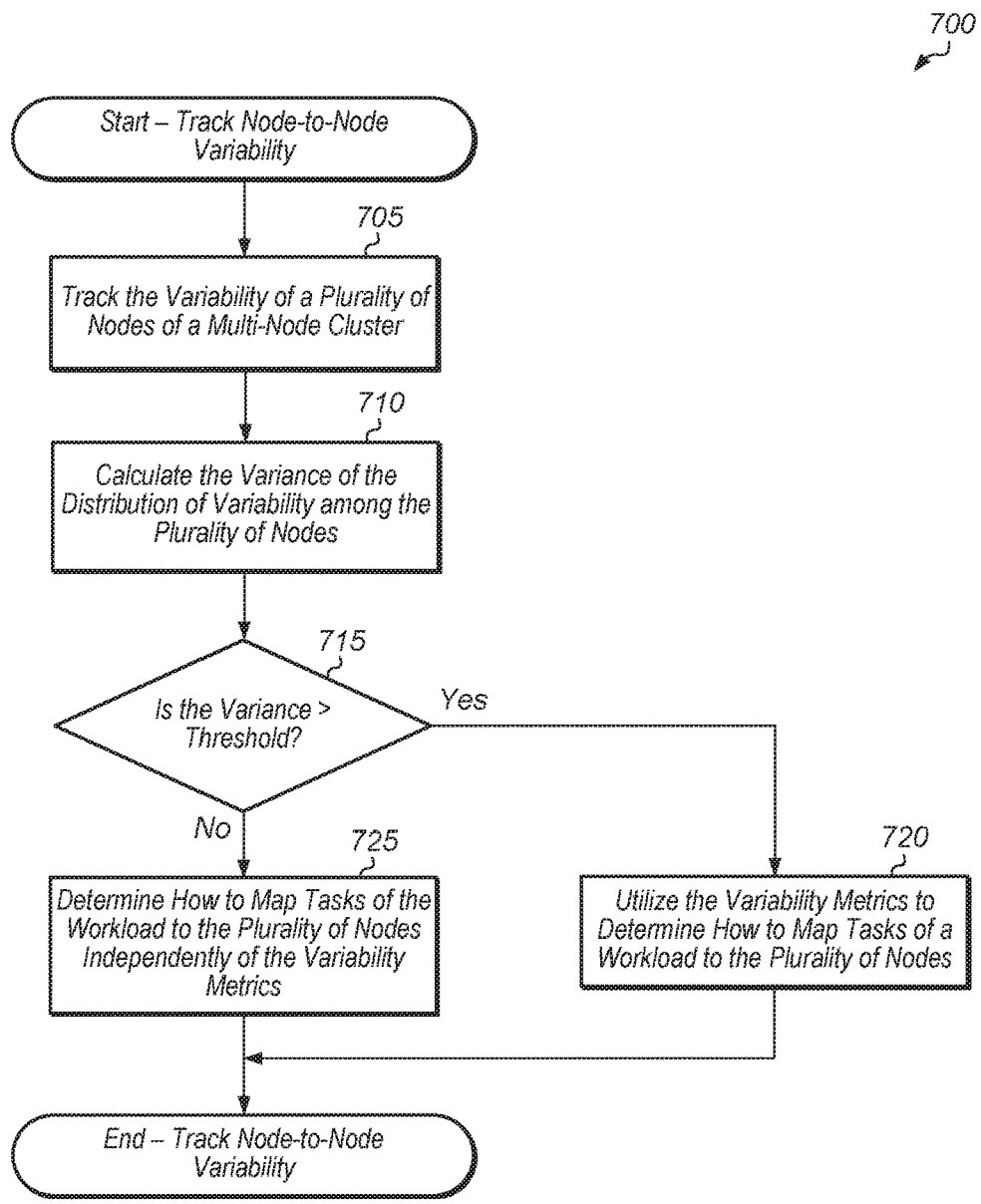
FIG. 7 is a generalized flow diagram illustrating another embodiment of a method for tracking node-to-node variability.

Referring now to FIG. 7, one embodiment of a method 700 for tracking node-to-node variability is shown. For purposes of discussion, the steps in this embodiment are shown in sequential order. It should be noted that in various embodiments of the method described below, one or more of the elements described may be performed concurrently, in a different order than shown, or may be omitted entirely. Other additional elements may also be performed as desired. Any of the various systems or processors described herein may be configured to implement method 700.

A cluster agent may track the variability of a plurality of nodes of a multi-node cluster (block 705). The variability of the plurality of nodes may be calculated based on one or more parameters including aging, temperature, power, performance, hardware, instruction set architectures (ISAs), communication calls, fault rates, process variations, application characteristics, and other parameters. In one embodiment, the cluster agent may generate a variability metric for each node of the plurality of nodes. The cluster agent may calculate the variance of the distribution of variability among the plurality of nodes (block 710). In other embodiment, the cluster agent may utilize other techniques to measure and quantify the distribution of variability among the plurality of nodes.

If the variance of the variability distribution exceeds a given threshold (conditional block 715, "yes" leg), then the cluster agent may utilize the variability metrics to determine how to map tasks of a workload to the plurality of the nodes (block 720). For example, if there is a wide range of node variability metrics, then the cluster may benefit from having the cluster agent utilize node variations to make mapping decisions when mapping tasks of the workload to the plurality of the nodes. If the variance of the variability distribution does not exceed the given threshold (conditional block 715, "no" leg), then the cluster agent may determine how to map tasks of the workload to the plurality of the nodes independently of the variability metrics (block 725). After blocks 720 and 725, method 700 may end.

Figure 8:
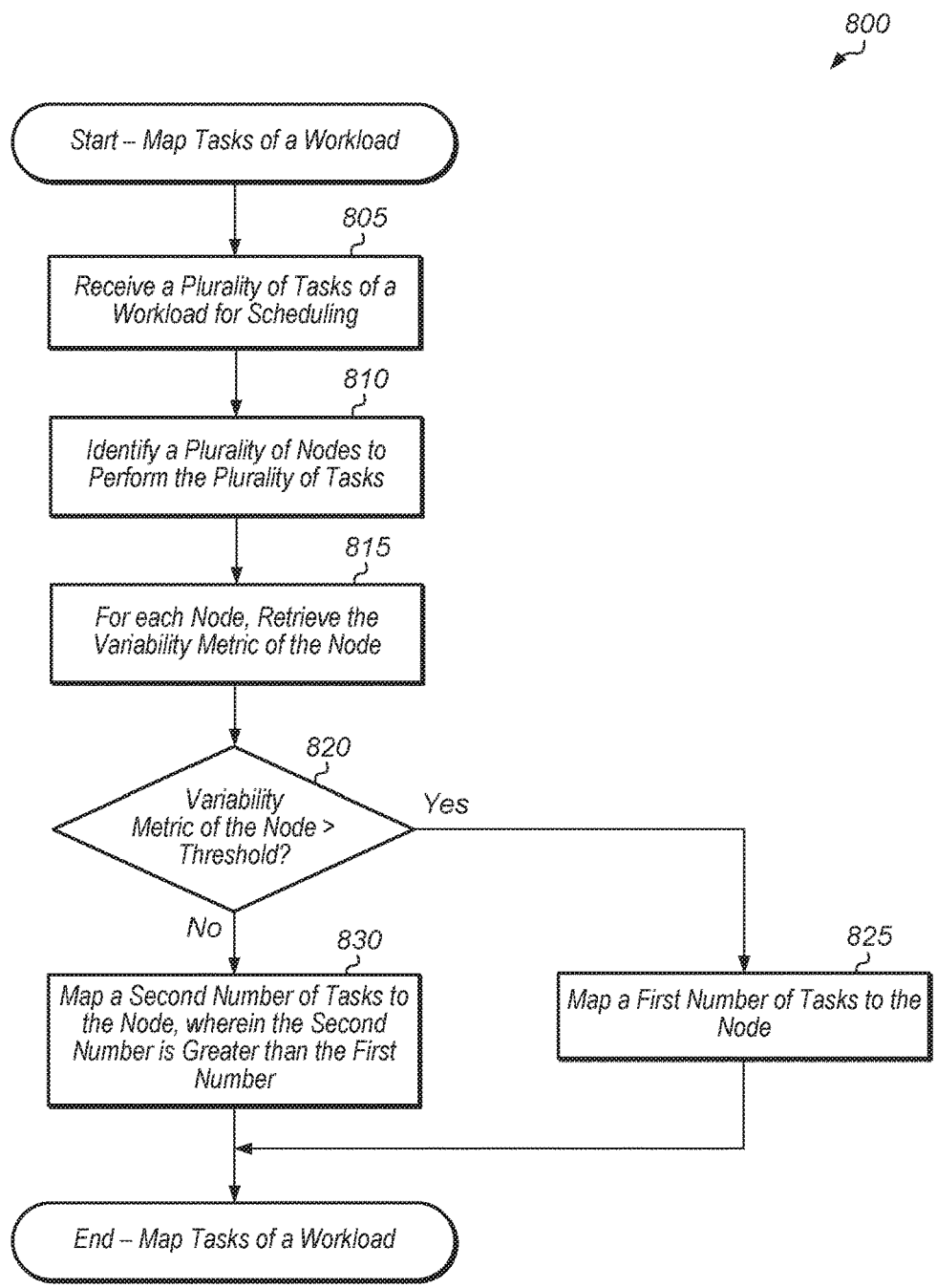
FIG. 8 is a generalized flow diagram illustrating one embodiment of a method for mapping tasks of a workload.

Turning now to FIG. 8, one embodiment of a method 800 for mapping tasks of a workload is shown. For purposes of discussion, the steps in this embodiment are shown in sequential order. It should be noted that in various embodiments of the method described below, one or more of the elements described may be performed concurrently, in a different order than shown, or may be omitted entirely. Other additional elements may also be performed as desired. Any of the various systems or processors described herein may be configured to implement method 800.

A mapper may receive a plurality of tasks of a workload for scheduling (block 805). The mapper may identify a plurality of nodes to perform the plurality of tasks (block 810). Next, for each node, the mapper may retrieve the variability metric of the node (block 815). Then, for each node, the mapper may determine if the variability metric of the node is greater than a programmable threshold (conditional block 820). If the variability metric of the node is greater than the programmable threshold (conditional block 820, "yes" leg), then the mapper may map a first number of tasks to the node (block 825). If the variability metric of the node is less than the programmable threshold (conditional block 820, "no" leg), then the mapper may map a second number of tasks to the node, wherein the second number is greater than the first number (block 830). Alternatively, in another embodiment, instead of changing the number of tasks mapped to the node based on the variability metric, the mapper may map non-critical tasks to the node if the variability metric of the node is greater than the programmable threshold or the mapper may map critical tasks to the node if the variability metric of the node is less than the programmable threshold.

It may be assumed for the purposes of this discussion that a lower variability metric indicates the node is a higher performance node. In another embodiment, a lower variability metric may indicate that the node is a lower performance node, in which case blocks 825 and 830 may be swapped in method 800. It is noted that in other embodiments, the mapper may compare the variability metric of the node to multiple thresholds, and the number of tasks mapped to the node may be based on the comparison of the variability metric to the multiple thresholds. After blocks 825 and 830, method 800 may end.

Figure 9:
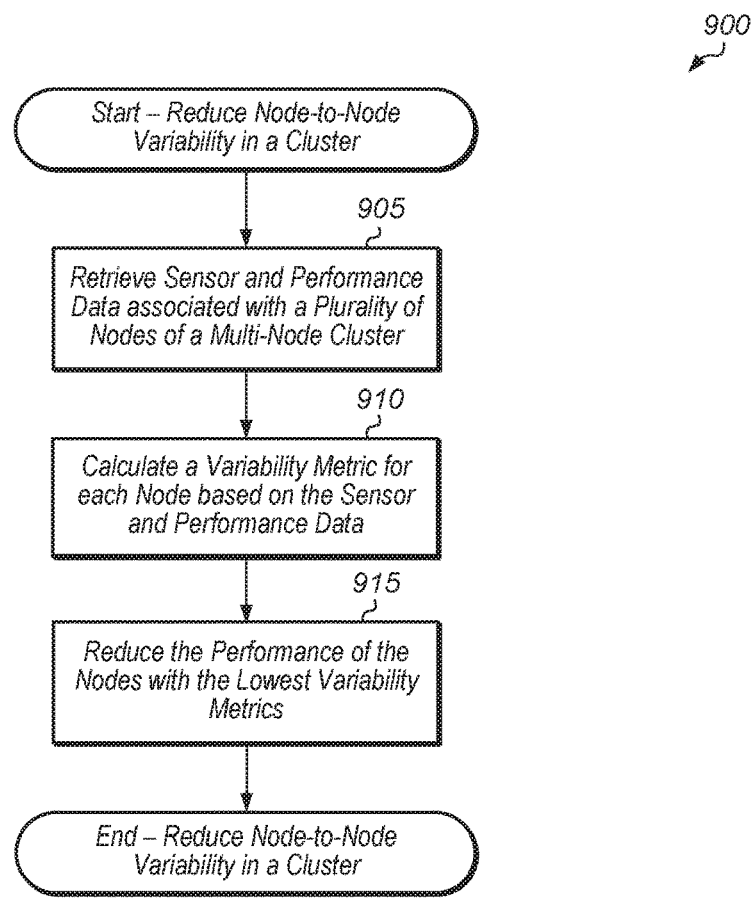
FIG. 9 is a generalized flow diagram illustrating one embodiment of a method for reducing node-to-node variability in a cluster.

Referring now to FIG. 9, one embodiment of a method 900 for reducing node-to-node variability in a cluster is shown. For purposes of discussion, the steps in this embodiment are shown in sequential order. It should be noted that in various embodiments of the method described below, one or more of the elements described may be performed concurrently, in a different order than shown, or may be omitted entirely. Other additional elements may also be performed as desired. Any of the various systems or processors described herein may be configured to implement method 900.

A cluster agent may retrieve sensor and performance data associated with a plurality of nodes of a multi-node cluster (block 905). Depending on the embodiment, the sensor and performance data may include one or more of aging, temperature, power, performance, hardware, instruction set architectures (ISAs), communication calls, fault rates, process variations, application characteristics, and other parameters. The cluster agent may calculate a variability metric for each node of the plurality of nodes based on the sensor and performance data (block 910).

The cluster agent may then reduce the performance of the nodes with the lowest variability metrics (block 915). After block 915, method 900 may end. In one embodiment, the cluster agent may reduce performance by reconfiguring the node hardware such that performance and power efficiency are maximized and variability is reduced. Depending on the embodiment, the cluster agent may reconfigure the node hardware using DVFS or by changing other parameters such as number of cores, memory bandwidth, cache size, etc. In one embodiment, the cluster agent may reduce the performance of each node by an amount proportional to the inverse of the variability metric of the node so as to reduce the variability of the cluster. Some workloads may benefit by being executed on nodes with equal or similar performance, and by reducing the variability of the cluster, the cluster agent may ensure that these workloads are executed more efficiently.

In various embodiments, program instructions of a software application may be used to implement the methods and/or mechanisms previously described. The program instructions may describe the behavior of hardware in a high-level programming language, such as C. Alternatively, a hardware design language (HDL) may be used, such as Verilog. The program instructions may be stored on a non-transitory computer readable storage medium. Numerous types of storage media are available. The storage medium may be accessible by a computing system during use to provide the program instructions and accompanying data to the computing system for program execution. The computing system may include at least one or more memories and one or more processors configured to execute program instructions.

It should be emphasized that the above-described embodiments are only non-limiting examples of implementations. Numerous variations and modifications will become apparent to those skilled in the art once the above disclosure is fully appreciated. It is intended that the following claims be interpreted to embrace all such variations and modifications.

What is claimed is:

1. A system comprising:
    a plurality of nodes, wherein each node of the plurality of nodes comprises:
        one or more physical sensors; and
        one or more processing elements for executing instructions; and
    a cluster agent configured to:
        monitor one or more metrics associated with each node of the plurality of nodes;
        monitor sensory data from one or more physical sensors of each node of the plurality of nodes;
        calculate a variability metric for each node of the plurality of nodes based on the one or more metrics and the sensory data;
        receive a workload to be performed by the plurality of nodes, wherein the workload comprises a plurality of tasks;
        determine a mapping of the plurality of tasks to the plurality of nodes based on the variability metric of each node of the plurality of nodes, wherein the mapping results in an increase in power efficiency of the system without a reduction in performance while executing the workload;
        map non-critical tasks to nodes which have a variability metric which is greater than a threshold; and
        map critical tasks to nodes which have a variability metric which is less than or equal to the threshold;
    wherein each node is configured to execute instructions to perform each task assigned by the cluster agent.

2. The system as recited in claim 1, wherein the one or more metrics include at least one or more instruction set architecture and communication calls, and wherein a critical task is a task which is on a critical path.

3. The system as recited in claim 1, wherein the cluster agent is further configured to:
    predict a future variability metric for each node based on the one or more metrics and the sensory data; and
    determine a mapping of the plurality of tasks to the plurality of nodes based on a combination of a current variability metric and the future variability metric of each node of the plurality of nodes.

4. The system as recited in claim 1, wherein the cluster agent is further configured to:
calculate a variance of a distribution of variability metrics among the plurality of nodes;
determine a mapping of the plurality of tasks to the plurality of nodes based on the variability metric of each node of the plurality of nodes responsive to the variance being greater than a threshold; and
determine a mapping of the plurality of tasks to the plurality of nodes independently of the variability metric of each node of the plurality of nodes responsive to the variance being less than or equal to the threshold.

5. The system as recited in claim 1, wherein variability metrics capture node to node variation at runtime among the plurality of nodes.

6. The system as recited in claim 1, wherein the cluster agent is further configured to calculate the variability metric for each node based on sensor measurements, workload characteristics, ambient conditions, dynamic voltage and frequency scaling residencies, communication calls, and failure rates of the node.

7. The system as recited in claim 1, wherein variability metric for a node is calculated based at least in part on an age of the node.

8. A method comprising:
monitoring one or more metrics associated with each node of a plurality of nodes;
monitoring sensory data from one or more physical sensors of each node of the plurality of nodes
calculating a variability metric for each node of the plurality of nodes based on the one or more metrics and the sensory data;
receiving a workload to be performed by the plurality of nodes, wherein the workload comprises a plurality of tasks;
determining a mapping of the plurality of tasks to the plurality of nodes based on the variability metric of each node of the plurality of nodes, wherein the mapping results in an increase in power efficiency of the system without a reduction in performance while executing the workload;
mapping non-critical tasks to nodes which have a variability metric which is greater than a threshold;
mapping critical tasks to nodes which have a variability metric which is less than or equal to the threshold; and
executing instructions on each node to perform each assigned task.

9. The method as recited in claim 8, wherein the one or more metrics include at least one or more instruction set architecture and communication calls, and wherein a critical task is a task which is on a critical path.

10. The method as recited in claim 8, further comprising:
predicting a future variability metric for each node based on the one or more metrics and the sensory data; and
determining a mapping of the plurality of tasks to the plurality of nodes based on a combination of a current variability metric and the future variability metric of each node of the plurality of nodes.

11. The method as recited in claim 8, further comprising:
calculating a variance of a distribution of variability metrics among the plurality of nodes;
determining a mapping of the plurality of tasks to the plurality of nodes based on the variability metric of each node of the plurality of nodes responsive to the variance being greater than a threshold; and
determining a mapping of the plurality of tasks to the plurality of nodes independently of the variability metric of each node of the plurality of nodes responsive to the variance being less than or equal to the threshold.

12. The method as recited in claim 8, wherein variability metrics capture node to node variation at runtime among the plurality of nodes.

13. The method as recited in claim 8, further comprising calculating the variability metric for each node based on sensor measurements, workload characteristics, ambient conditions, dynamic voltage and frequency scaling residencies, communication calls, and failure rates of the node.

14. The method as recited in claim 8, wherein the variability metric for a node is calculated based at least in part on an age of the node.

15. A non-transitory computer readable storage medium comprising program instructions, wherein the program instructions are executable to:
monitor one or more metrics associated with each node of a plurality of nodes;
monitor sensory data from one or more physical sensors of each node of the plurality of nodes;
calculate a variability metric for each node of the plurality of nodes based on the one or more metrics and the sensory data;
receive a workload to be performed by the plurality of nodes, wherein the workload comprises a plurality of tasks;
determine a mapping of the plurality of tasks to the plurality of nodes based on the variability metric of each node of the plurality of nodes, wherein the mapping results in an increase in power efficiency of the system without a reduction in performance while executing the workload;
map non-critical tasks to nodes which have a variability metric which is greater than a threshold;
map critical tasks to nodes which have a variability metric which is less than or equal to the threshold; and
execute instructions on each node to perform each assigned task.

16. The non-transitory computer readable storage medium as recited in claim 15, wherein the one or more metrics include at least one or more instruction set architecture and communication calls, and wherein a critical task is a task which is on a critical path.

17. The non-transitory computer readable storage medium as recited in claim 15, wherein the program instructions are further executable to:
predict a future variability metric for each node based on the one or more metrics and the sensory data; and
determine a mapping of the plurality of tasks to the plurality of nodes based on a combination of a current variability metric and the future variability metric of each node of the plurality of nodes.

18. The non-transitory computer readable storage medium as recited in claim 15, wherein the program instructions are further executable to:
calculate variance of a distribution of variability metrics among the plurality of nodes;
determine a mapping of the plurality of tasks to the plurality of nodes based on the variability metric of each node of the plurality of nodes responsive to the variance being greater than a threshold; and
determine a mapping of the plurality of tasks to the plurality of nodes independently of the variability metric of each node of the plurality of nodes responsive to the variance being less than or equal to the threshold.

19. The non-transitory computer readable storage medium as recited in claim 15, wherein variability metrics capture node to node variation at runtime among the plurality of nodes.

20. The non-transitory computer readable storage medium as recited in claim 15, calculate the variability metric for each node based on sensor measurements, workload characteristics, ambient conditions, dynamic voltage and frequency scaling residencies, communication calls, and failure rates of the node.

* * * * *

UNITED STATES PATENT AND TRADEMARK OFFICE
CERTIFICATE OF CORRECTION

PATENT NO. : 10,355,966 B2
APPLICATION NO. : 15/081558
DATED : July 16, 2019
INVENTOR(S) : Wasmundt et al.

Page 1 of 1

It is certified that error appears in the above-identified patent and that said Letters Patent is hereby corrected as shown below:

In the Claims

Column 13, Claim 7, Line 24, please delete "wherein variability" and substitute -- wherein a variability --.

Signed and Sealed this
Twenty-ninth Day of October, 2019

Andrei Iancu
*Director of the United States Patent and Trademark Office*